Aug. 22, 1961

M. GARAFOLA 2,996,931

ACCELERATOR PEDAL EXTENSION

Filed Dec. 18, 1959

INVENTOR.
MICHAEL GARAFOLA

BY Eyre, Mann & Lucas

ATTORNEYS.

United States Patent Office 2,996,931
Patented Aug. 22, 1961

2,996,931
ACCELERATOR PEDAL EXTENSION
Michael Garafola, 315 8th St., Union City, N.J.
Filed Dec. 18, 1959, Ser. No. 860,469
6 Claims. (Cl. 74—562)

This invention relates to an extension for accelerator pedals of motor vehicles.

Motor vehicle accelerator pedals normally are positioned considerably below the height of the brake pedal. Operating the brake and accelerator therefore is tiring, especially in congested traffic. Also, a driver of short stature may have difficulty in reaching the accelerator pedal.

In accordance with the invention, a one piece extension has been provided which can be attached readily to a motor vehicle accelerator pedal to provide an elevated surface, such as at the height of the brake pedal, by which the accelerator can be operated. The extension comprises a resilient self-supporting metal sheet which is folded into a top portion, two side portions on either side thereof, the side portions terminating in two marginal clamping portions. The side portions are bent towards each other at acute angles to the top portion and this construction in combination with the resiliency of the sheet metal provides spring action to hold the marginal clamping portions in engagement with the sides of the accelerator pedal. The extension is thus adapted to fit accelerator pedals of any size and is simple to install since it can be slid on the accelerator pedal.

The extension is low in cost and very economical to manufacture since a blank of suitable dimensions can be stamped out of flat sheet metal and then folded into the required configuration in accordance with the invention. The fact that the side portions are at acute angles to the top portion is important since this provides substantial spring action in the side portions of the extension. Also, because of the acute angles of the side portions and the resulting V-shaped structure, pressure of the driver's foot on the top portion urges the side portions and the clamping portions to move closer together. This materially increases the grip of the clamping portions on the sides of the accelerator and insures that the extension will remain securely positioned in firm engagement with the accelerator at all times during use.

Figure 1:
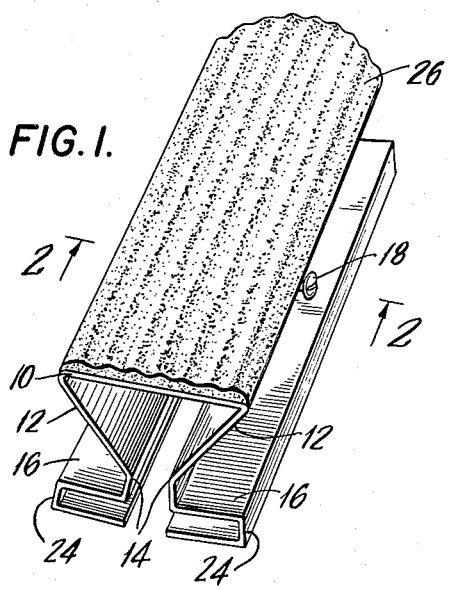
Figure 2:
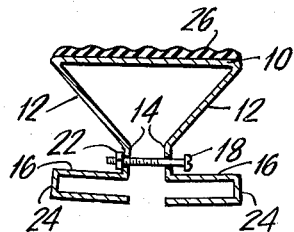
Figure 3:
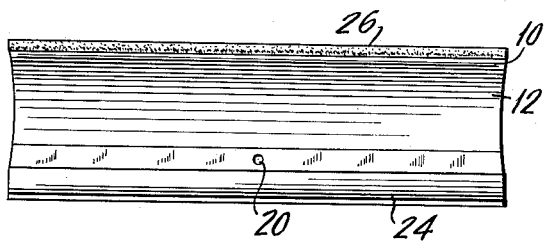
Figure 4:
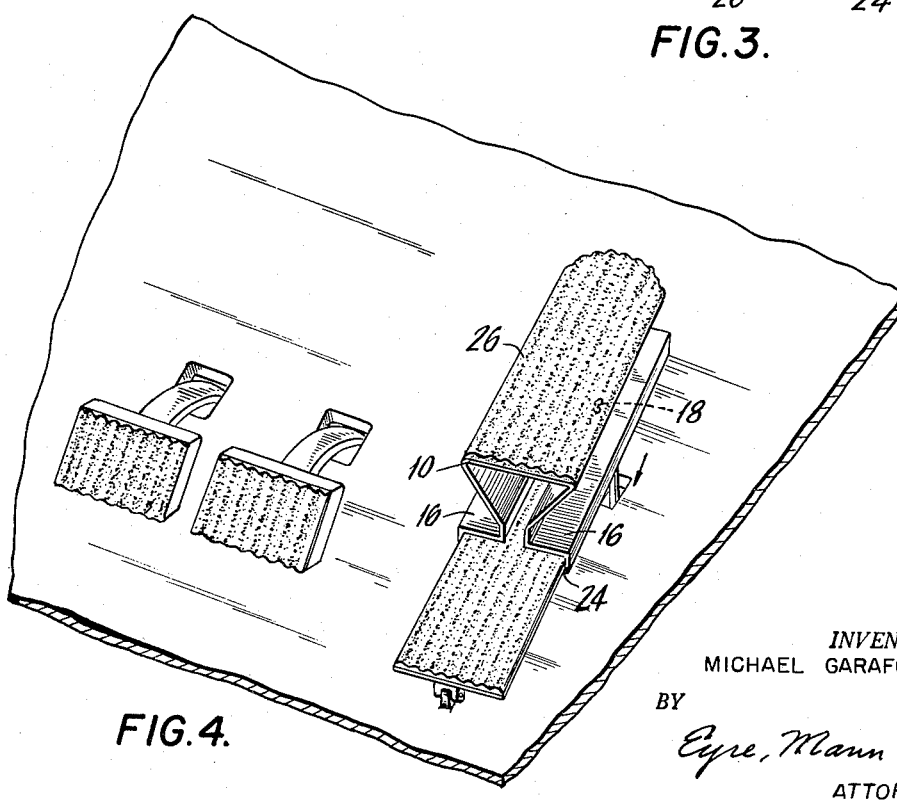

Further advantages and details of the structure of the present invention may be readily understood by reference to the accompanying drawings in which:

FIG. 1 is a perspective view of the extension.
FIG. 2 is a cross section taken through line 2—2 of FIG. 1.
FIG. 3 is a side view of the extension.
FIG. 4 is a perspective view of a portion of motor vehicle floorboard showing the extension partially mounted on the accelerator pedal.

As shown in FIG. 1 the extension is a sheet of metal which is folded into a top portion 10, side portions 12, and marginal clamping portions 16. The top portion 10 of the extension shown is a flat regular surface which desirably conforms to the general shape of conventional motor vehicle accelerator pedals. The top portion 10 shown is also covered with a rubber mat 26 to provide a cushioned non-slip surface for the foot. However, instead of as shown, the top portion can be curved either upwardly or downwardly, or otherwise irregularly and the rubber mat can be omitted.

Side portions 12 are bent towards each other at acute angles to the top portion, and are parallel to each other at points 14. The side portions continue into marginal clamping portions 16 which are disposed opposite each other in cooperating relationship. The side portions 12 have aligned holes 22 therein through which bolt 18 is inserted and threaded through nut 22 (FIGS. 2–3). Bolt 18 is used to lock the extension on the accelerator pedal after installation. However, bolt 18 is not required where a snug fit is obtained without it. U-shaped marginal clamping portions 16 are adapted to engage the sides of the accelerator pedal. The clamping portions normally are spaced apart by a distance less than the width of the motor vehicle accelerator pedal so that when spread apart they can be slipped over the pedal and then engage it firmly in endeavoring to return to the normal position.

The extension is very simply installed. As shown in FIG. 4, clamping portions 16 are spread apart until they can be slipped over the sides of the accelerator pedal. Then the extension is lid down the accelerator (arrow). In the unit shown, when the ends of the extension are aligned with the accelerator pedal, substantially all of the operative face of the accelerator pedal is covered by the top portion 10 of the extension. However, the top portion can be wider or narrower or shorter or otherwise different in shape from the operative face of the accelerator pedal.

The vertical walls 24 of the marginal clamping portions 16 normally firmly engage the sides of the accelerator pedal under the spring bias of the side portions of the extension. If the installation is desired to be made permanent, bolt 18 can be tightened to lock the marginal clamping portions to the sides of the accelerator. Also, in case marginal clamping portions 16 are spread apart to so great an extent that the angle between the side portions of the top portion is increased by deformation of the metal and spring action in the side portions is thereby reduced, the bolt may be used to counteract the loss of spring action and still lock the extension to the accelerator pedal.

The extension is preferably made out of flat metal sheet. Sheet of various materials such as steel, iron, and iron alloys is suitable. The resiliency of the sheet will vary with the type of material used. The controlling consideration in selecting a particular material is that it provide enough spring action in the side portions so that the marginal clamping portions can be spread apart and be spring-biased to the closed position whereby the sides of the accelerator pedal can be engaged under pressure. The thickness of the sheet is not critical. It has been found that suitable gauges or thicknesses for zinc-iron alloy sheet are from about 36 (0.007 inch) to about (0.0375 inch). Zinc-iron alloy sheets of lower thickness are too flexible to withstand the pressure of the foot without collapsing, while sheets of greater thickness are too stiff and not sufficiently resilient to provide the required spring action in the extension.

If desired spring action of the marginal clamping portions of the extension can be increased by positioning one or more helical tension springs within the side portions of the extension. It is recommended that the load axis of the spring be disposed parallel to the top portion of the extension. Other non-essential modifications of the extension will be obvious to those skilled in the art, and it is intended to cover all such modifications which do not depart from the spirit and scope of the invention.

What is claimed is:

1. An extension for attachment to the sides of the accelerator pedal of a motor vehicle comprising a resilient self-supporting metal sheet folded into a top portion, intermediate two side portions and two marginal clamping portions, the top portion being supported by the side portions in spaced relationship to the clamping portions, and the side portions being bent towards each other at acute angles to the top portion, the clamping portions being a continuation of each of the side portions and having a length substantially equal to the length of the accelerator pedal and being U-shaped to engage the sides of the accelerator pedal, and being spaced apart by a distance less than the corresponding dimension of the accelerator pedal to be engaged thereby, for spring-biasing the clamping portions into engagement with the sides of the accelerator pedal.

2. The extension in accordance with claim 1 which includes two aligned holes in the side portions and means through the holes to hold the side portions and marginal clamping portions in a fixed position.

3. The extension in accordance with claim 1 whose top portion is surfaced with frictional material.

4. The extension in accordance with claim 1 adapted to bring the level of the accelerator pedal to the height of an adjacent control pedal.

5. The extension in accordance with claim 1 which is of a length substantially equal to the length of the accelerator pedal.

6. The extension in accordance with claim 1 which comprises a sheet of zinc-iron alloy having a thickness of about 0.007 to about 0.0375 inch.

References Cited in the file of this patent

UNITED STATES PATENTS

| | | |
|---|---|---|
| 1,918,919 | Lambert | July 18, 1933 |
| 1,977,415 | Thorp | Oct. 16, 1934 |
| 2,028,073 | Lambert | Jan. 14, 1936 |
| 2,688,262 | Bolton | Sept. 7, 1954 |
| 2,697,949 | Warne | Dec. 28, 1954 |
| 2,802,375 | Van der Gaast | Aug. 13, 1957 |
| 2,809,538 | Caldwell | Oct. 15, 1957 |